3,505,365
PROCESS FOR PRODUCING 11β-HYDROXY-ANDROST-4-ENE-3,17-DIONE
Bradford H. Walker, Portage, Mich., assignor to The Upjohn Company, Kalamazoo, Mich., a corporation of Michigan
No Drawing. Continuation-in-part of application Ser. No. 472,355, July 15, 1965. This application Feb. 12, 1968, Ser. No. 704,541
Int. Cl. C07c *167/18*
U.S. Cl. 260—397.45
4 Claims

ABSTRACT OF THE DISCLOSURE

This invention relates to the production of 11β-hydroxyandrost-4-ene-3,17-dione from 11β,17α,20α,21-tetrahydroxy-4-pregnene-3-one 21-acylate by cleavage of the 17-side chain with lead tetracetate in the presence of an organic diluent.

CROSS REFERENCE

This application is a continuation-in-part of application Ser. No. 472,355, filed July 15, 1965, now abandoned.

BRIEF SUMMARY OF THE INVENTION

The product of this invention is a useful intermediate in the preparation of 17β-hydroxy-4,9(11)-androstadiene-3-one, which is useful as a steroid oral androgenic, as is disclosed in U.S. Patent 2,769,019.

The starting material for this invention, 11β,17α,20α,21-tetrahydroxy-4-pregnene-3-one 21-acetate occurs as a by-product in the commercial synthesis of such products as hydrocortisone. Other 2-acylates where the acyl group is that of a hydrocarbon carboxylic acid of from 1 to 12 carbon atoms such as the 21-propionate, butyrate, valerate and the like can be used.

One of the advantages of the process of this invention is that it provides a method for preparing valuable steroid intermediates from these compounds heretofore possessing little use and value.

We have discovered that when the 20α analogues of this invention are used as starting material, lead tetracetate can be used instead of periodic acid or its salts, and that the reaction proceeds smoothly and economically even when using a wide variety of organic solvents.

The invention is carried out preferably with lead tetracetate using acetic acid as the organic diluent and employing a weight ratio of starting steroid to acetic acid of 1:5–20 and a weight ratio of starting steroid to lead tetracetate of 1:1–2. Other organic carboxylic acids can be used instead of acetic acid as the organic diluent, and reaction temperatures ranging from the freezing point of the acid up to its boiling point can be used. Reaction temperatures of around room temperature are preferred. Other organic diluents such as $CHCl_3$, $CH_2Cl_2$, $CCl_4$, chlorinated hydrocarbons, ketones such as acetone, esters such as ethyl acetate and ethers such as diethyl ether can be used.

A considerable technical advantage of the invention is that the much more readily available lead oxide can be used in combination with acetic acid to form lead tetracetate in situ and to produce the 17-keto products previously mentioned in good yield. In such event the acetic acid, an inexpensive reagent, is used both as organic diluent and as reacting agent to convert the lead oxide to its tetracetate in situ. Thus the preformed lead tetracetate can be replaced by lead tetracetate formed in situ.

The course of the reaction is conveniently followed by means of thin-layer chromatography comparison with an authentic sample of the product.

The 20β analogue of the 11β starting material of this invention is known in the literature as Reichstein's Substance E. The latter compound is known to undergo oxidative cleavage by periodic acid to produce 11β-hydroxyandrost-4-ene-3,17-dione. However, periodic acid is a difficult and expensive reagent, so that its use has been restricted principally to analytical and structural work, where its unique reaction properties, e.g., with starch indicators, recommend it. For example, periodate salts are difficultly soluble in most organic solvents, which property seriously limits their use, particularly with high molecular weight organic compounds such as the steroids. Moreover the high molecular weight of periodic acid and its salts requires the use of large relative amounts; a particular disadvantage because of the high cost of initial reagents and the recovery of by-products.

DETAILED DESCRIPTION OF THE INVENTION

In the following specification the examples will be directed to preferred embodiments, it being understood that variations in starting material, reactants and in reaction conditions can be employed as discussed in the foregoing paragraphs.

EXAMPLE 1

*11β-hydroxy-androst-4-ene-3,17-dione*

To a 3 l. flask flooded with nitrogen there was added 200 g. of 11β,17α,20α,21-tetrahydroxy-4-pregnen-3-one 21-acetate. The charged steroid material was slurried in 2 l. of glacial acetic acid, whereupon 240 g. of lead tetracetate was added. The reaction mixture was stirred vigorously at about 23° C. until it became a nearly clear solution (after about 50 minutes). The reaction temperature rose to about 33° C. in 35 minutes and it remained approximately constant for the next 15 minutes. The reaction mixture was diluted with about 3 l. of water and extracted successively with 4 portions of 500 ml. of methylene chloride. The methylene chloride extracts were combined and washed twice with 500 ml. of water and once with sodium carbonate solution (pH 11). During the washing steps brown sludge formed which can be removed by filtration. The solution was concentrated to dryness in a vacuum, and the crystalline product dried in a vacuum oven at 60° C. The product assays correctly by thin-layer chromatography and is consistently 90–95% pure.

EXAMPLE 2

In a plant-scale run, 125 kg. of 11β,17α,20α,21-tetrahydroxy-4-pregnen-3-one 21-acetate, recovered as by-product of the synthesis of hydrocortisone was used as starting material in a process as described in Example 1 with the exception that 300 kg. of red lead oxide ($Pb_3O_4$) was used with 975 kg. of acetic acid. The steroid was dissolved in the acetic acid, after which the red lead oxide was added and the mixture agitated for about 40 minutes, at which time the reaction was complete.

After completion, 159 kg. of 90% formic acid was added, and the mixture agitated for an additional period of 30 minutes and the sludge removed by filtration. The filtrate, about 1500 liters, was vacuum distilled to reduce the volume to about 350 liters and extracted with a mixture of 420 liters of methylene chloride and 940 liters of deionized water. After separation of the methylene chloride layer, the aqueous layer was re-extracted with 420 liters of methylene chloride. The combined extracts were washed with aqueous sodium hydroxide solution, with hydrochloric acid solution and then with sodium hydroxide solution. The washed methylene chloride solution was distilled, giving 94.5 kg. of 11β-hydroxy-androst-4-ene-3,17-dione.

The above product, without further purification, was reacted with bromine and SO$_2$, giving 72.25 kg. of androst-4,9(11)-diene-3,17-dione of acceptable purity for use as an intermediate, without further purification, in the synthesis of 11β-hydroxy-9α-fluoro-17β-methyl testosterone. By thin-layer chromatography comparison it assayed 90–95% pure. The overall chemical yield of the two steps of this example is 87.5%.

I claim:

1. A process for producing 11β-hydroxy-androst-4-ene-3,17 - dione from 11β,17α,20α,21 - tetrahydroxy - 4 - pregnene-3-one 21-acylate in which the acyl group is that of a hydrocarbon carboxylic acid of from 1 to 12 carbon atoms which comprises reacting the latter with a member of the group consisting of preformed lead tetracetate and lead tetracetate formed in situ in the presence of an organic liquid diluent and recovering 11β-hydroxy-androst-4-ene-3,17-dione from the reaction mixture.

2. Process of claim 1 in which the starting material is 11β,17α,20α,21-tetrahydroxy-4-pregnene-3-one 21-acetate.

3. Process of claim 1 comprising reacting 11β,17α,20α, 21 - tetrahydroxy - 4 - pregnene - 3 - one 21 - acetate with red lead oxide in acetic acid thus to form 11β-hydroxy-androst-4-ene-3,17-dione and recovering the latter from the reaction mixture.

4. A process according to claim 3 wherein the 11β,17α, 20α,21 - tetrahydroxy - 4 - pregnene - 3 - one 21 - acetate employed is recovered as a by-product of the synthesis of hydrocortisone whereby the isomeric configuration of the 20 hydroxyl group is predominantly in the α-position.

References Cited

"Chemistry of the Steroids," by Shoppee (1964), Butterworth, Inc., Washington, D.C., pp. 254–255 relied on.

ELBERT L. ROBERTS, Primary Examiner